May 29, 1956　　F. E. PAYNE ET AL　　2,747,902
SEAL FOR WHEEL BRAKE
Filed Sept. 19, 1950

INVENTORS
Frank E. Payne
BY Harry J. Sole
Charles P. Vrytech
Atty.

2,747,902
SEAL FOR WHEEL BRAKE

Frank E. Payne, Glencoe, and Harry I. Sole, Chicago, Ill., assignors to Crane Packing Company, Chicago, Ill., a corporation of Illinois Application September 19, 1950, Serial No. 185,638

3 Claims. (Cl. 286—11.14)

This invention relates to sealing devices for relatively rotatable elements and particularly to a seal to be used with a rotating wheel and a brake therefor to keep dust, dirt and water out of the brake mechanism.

The principal object of this invention is to provide a rotary mechanical seal for the brake mechanism of a rotating wheel, hoist or the like, wherein the seal will have a long life and will be simple to make and install.

A more specific object of this invention is to provide a rotary mechanical seal for relatively rotatable elements wherein the seal is effected between a pair of radially disposed surfaces, one on each member, with auxiliary sealing means to prevent the entry of the greater part of dust, dirt and water into the seal chamber.

A specific object of this invention is to provide a rotary mechanical seal which is very compact and utilizes a readily available deformable sealing element having a circular radial cross-section and having adjacent thereto a seal which operates on a cylindrical surface.

Another specific object of this invention is the provision of a hard cylindrical wearing surface for a lip-type seal to be used with an end-face type of seal.

Figure 1:
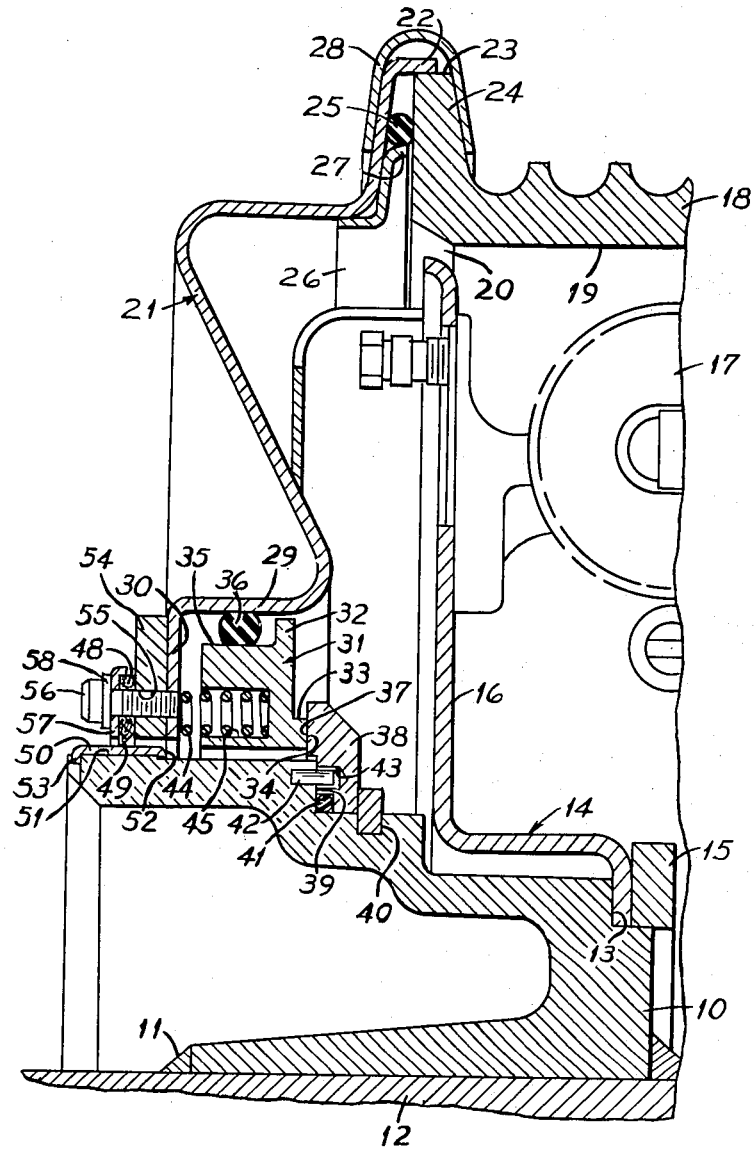
Figure 2:
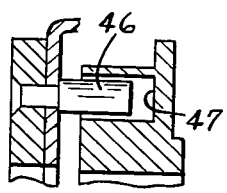

These and other objects and features of this invention will become apparent from the following detailed description when taken together with the accompanying drawings, in which Fig. 1 is a section taken through a brake drum, an axle and a seal made in accordance with this invention; and Fig. 2 is a fragmentary section taken through a part of the seal of Fig. 1.

Referring now to the drawings for a detailed description of the invention, there is shown a hub 10 which is preferably a forging, for greater strength and resistance to shock, said hub being secured as by welding 11 to a tubular housing 12 for the drive shaft for the vehicle wheel (not shown). Said hub 10 has a shoulder 13 formed thereon against which is pressed a brake support 14 by means of a ring 15 fastened with bolts or similar fasteners (not shown) to hub 10.

Said brake support 14 has a radially extending offset 16 on which is mounted a brake cylinder 17 secured to the usual brake shoe (not shown) by which the vehicle is brought to rest. The brake shoes in turn operate against a brake drum 18 rotatable with the vehicle wheel, said drum having an internal cylindrical surface 19 against which the brake shoes act. The offset 16 is spaced from brake drum 18 to provide clearance 20 between the stationary and rotating parts of the drum, and it is through this clearance space 20 that foreign particles such as dirt, dust and water normally enter to affect the operation of the brake.

Inasmuch as seals are relatively expensive and their cost varies as a function of their diameter, it is desirable to seal off space 20 by means of a seal having the smallest possible diameter. Accordingly, a stamped metal shield 21 is provided, said shield having a flange 22 fitting over the end 23 of a flange 24 on the outer end of the brake drum 18. Said flange 22 centers shield 21 with respect to brake drum 18. The shield 21 is sealed with respect to flange 24 by means of an endless ring 25 preferably made of rubber, either natural or synthetic or a combination of the two, and having a circular radial cross-section. Said rings are commonly known as O rings and are readily available in a variety of standard sizes and compounds. Said ring 25 is retained between flange 24 and shield 21 by means of a retaining ring 26 having an axially extending flange 27 which partially closes off the space between shield 21 and flange 24, thereby preventing the sealing ring 25 from working out of sealing contact with flange 24 and shield 21.

Shield 21 is held against flange 24 by means of a split ring 28 having a U-shaped section such that when the two parts of the ring are drawn together by bolts or other suitable clamping means (not shown), shield 21 will be locked against flange 24. In order to provide a variable controllable pressure upon ring 25, the shield and flange are provided with slightly converging surfaces and clamping ring 28 is made with the sides of the U slightly divergent so as to provide a wedging action which may be controlled by the amount of torque impressed upon the fastening screws or bolts used to hold the two halves of the ring 28 together.

Near its radially inward periphery, shield 21 is formed into a recess having an axially extending wall 29 and a radially extending wall 30. Within the recess is disposed a sealing washer 31 having a radially extending flange or shoulder 32 at the outer periphery thereof and an axially extending bead 33; the radial surface 34 of which is preferably ground and lapped so as to be perfectly flat and smooth. Said washer 31 is centered with respect to wall 29 and also sealed therefrom by an endless ring 36 made of resilient deformable material such as rubber, either natural or synthetic or a combination of the two and having a circular radial cross-section. Thus ring 36 may likewise be an O ring which is readily available in a number of standard sizes and compounds. Said ring 36 contacts washer 31 along the cylindrical surface 35 thereon which surface is substantially concentric with wall 29 such that washer 31 may move axially with respect to wall 29 without changing the radial dimension of the space in which ring 36 operates. Thus, a fluid-tight seal may be assured between shield 21 and washer 31 regardless of the position of washer 31 relative to wall 29.

It is contemplated that the dimensions of the wall 29, surface 35 and the thickness of ring 36 will be such that said ring 36 will be slightly in compression initially and hence will form a fluid-tight seal between the washer 31 and wall 29 immediately. Should washer 31 vibrate axially with respect to wall 29, ring 36 will be rolled against wall 29 and along surface 35, but inasmuch as the radial cross-section of ring 36 is circular, such rolling action does not in any way affect the seal between wall 29 and washer 31.

Surface 34 on washer 31 abuts on a surface 37 on a cast iron endless ring 38 which in turn abuts on a shoulder 39 on hub member 10. Said surface 37 is similarly made perfectly flat and smooth so as to form with surface 34 a fluid-tight joint while said surfaces 34 and 37 are rotating relative to one another as well as while the two are stationary. Ring 38 is held against shoulder 39 by means of a snap ring 40 and is sealed with respect to hub member 10 by an endless ring 41 which may likewise be formed with a circular radial cross-section and made of material such as rubber, either natural or synthetic or a combination of the two. Said ring 41 is in compression between ring 38 and hub 10, either radially or axially or both, so that ring 38 will be sealed with respect to hub member 10 despite a somewhat loose fit of said ring 38 on hub member 10 or with respect to snap ring 40. To insure that ring 38 will be fixed relative to hub member 10, one or more pins 42 are provided which extend into suitable blind holes 43 in ring 38.

By making ring 38 separable with respect to hub 10, and particularly by providing that surface 37 should overhang or extend beyond any flat surface on ring 38, it is possible to grind and lap surface 37 to the required flatness and smoothness without the use of special lapping fixtures.

Washer 31 is held against ring 38 by a plurality of helical springs 44 operating in suitable recesses 45 in washer 31 and compressed between the bottoms of said recesses 45 and the radial wall 30 of shield 21. In order to make sure that washer 31 does not rotate relative to shield 21, a series of pins 46 (Fig. 2) is provided. Each pin 46 extends into suitable recesses 47 formed in washer 31 between adjacent springs 44, and is secured by riveting or otherwise to radial wall 30 on shield 21.

It will be apparent thus far that an end-face seal has been provided between shield 21 and hub member 10 which in effect provides a seal between drum 18 and offset 16. It has been found, however, that the lapped surfaces 34 and 37 may be quickly damaged by the entry of sand and gritty particles into the space between washer 31 and hub member 10. Once such gritty substances begin to affect the surfaces 34 and 37, the action is quite rapid and the seal soon becomes ineffective.

To prevent the entry of dirt into the space between washer 31 and hub 10, a lip-type seal is provided. This seal is comprised of a washer 48 made of deformable material such as leather, said washer having a relatively thin and deformable lip 49 which is free to flex and follow vibrations or other movement of hub 10. Said lip 49 frictionally engages a band 50 of a material which is somewhat harder than the material of hub 10, said band 50 being pressed upon a slightly enlarged surface 51 on hub 10. To prevent band 50 from moving axially relative to hub 10, the ends are staked over at intervals as shown at 52 and 53.

Washer 48 is compressed against a ring 54 welded to shield 21 so as to be sealed with respect thereto as well as held thereagainst, said ring 54 having a plurality of holes 55 which are threaded to receive bolts 56. A ring 57 serves to distribute the pressure of bolts 56 uniformly about the periphery of the leather ring 48, and the openings in ring 57 through which bolts 56 extend are made fluid-tight by soft copper washers 58 compressed between the heads of bolts 56 and ring 57.

It is contemplated that the end-face seal above described will be assembled with respect to shield 21 from the right-hand side as viewed in Fig. 1. Thus the lip-type seal is first assembled on shield 21 after which washer 31 and ring 36 together with a plurality of springs 44 are indexed in the recess formed by walls 29 and 30 relative to drive pin 46 and are then pressed into the said recess. Following this, seat ring 38 is assembled relative to hub member 10 by indexing blind holes 43 relative to pins 42 with ring 41 in place, and then pushing the assembly to the left as viewed in Fig. 1 until snap ring 40 is in place.

It has been found from actual tests that a combination of end-face seal and lip-type seal described above works satisfactorily not only to exclude dust, dirt and water, but to prolong the life of the brake and brake drum. For example, after 14,000 miles of hard usage on trucks in both dry and extremely wet conditions, the seal faces 37 and 34 show a negligible amount of wear and the brake drum is perfectly dry. The particles of the drum worn by the shoes as well as the particles removed from the shoes themselves still remain in the space defined by the shield 21 and the brake drum after the aforementioned 14,000 miles of rough use, indicating that there is no leakage between the drum space and the exterior of the wheel.

If desired, the space between washer 31 and shield 21 and particularly radial wall 30 may be packed with a suitable lubricant to provide lubrication for the seal faces 34 and 37. When properly lubricated, these faces, it is estimated, will last for at least 50,000 miles of operation of the vehicle. If the lubricant is in the form of grease, a suitable fitting (not shown) may be provided on shield 21 to the left of washer 31 and ring 36 as viewed in Fig. 1 to enable a mechanic to apply a standard grease gun thereto and thereby fill the space with grease.

Although under average conditions ring 36 eventually takes a set so that it loses its circular radial cross-section, it has been found that in an application such as the brake drum described above, there appears to be sufficient vibration axially as well as radially to keep the ring 36 in motion and thereby prevent said ring from taking a permanent set. The ring seal with the aforementioned example was found to be perfectly aligned in cross-section despite the 14,000 miles of usage.

It is understood that although the seal of this invention has been described with reference to its use on a vehicle, the scope of the invention is not so limited and should be determined instead by the appended claims.

What is claimed is:

1. A seal for sealing the annular space existing between a stationary central supporting hub presenting an outer cylindrical surface and a concentric surrounding brake drum, said seal comprising a generally circular disk-like shield having its outer peripheral regions secured to and sealed with respect to the outer end of said brake drum, said shield extending radially inwardly toward said hub and having a laterally turned portion providing a cylindrical wall spaced from said hub, and a radial flange extending inwardly from the outer end of said cylindrical wall to a region in close proximity to said hub, thus providing a central opening closely surrounding the hub, a seal seat mounted on said hub and presenting a radially extending outwardly facing seat surface, a sealing washer surrounding said hub and having a radially extending inwardly facing sealing surface designed for running contact with the opposed sealing surface on the seal seat, said washer being disposed within the cylindrical confines of said cylindrical wall on the shield, a first flexible deformable sealing element disposed between the washer and the cylindrical wall on said shield, means establishing a driving connection between the washer and shield, means yieldingly urging said washer toward said seat to cause the running sealing surfaces on the washer and seat to bear against each other in sealing relationship, and a second flexible deformable sealing element surrounding said hub and secured to said shield adjacent the edge of the central opening provided therein and having a lip bearing against the cylindrical surface on said hub and having wiping contact therewith, said first flexible deformable sealing element and said opposed running surfaces on the sealing washer and seal seat on the one hand and said second flexible deformable sealing element on the other hand providing an annular chamber therebetween adapted to contain a lubricant.

2. A seal as set forth in claim 1 wherein said means establishing a driving connection between the washer and shield comprises a drive pin secured to the radial flange of the shield and projecting inwardly toward said washer, said washer being formed with a recess therein into which said driving pin extends.

3. A seal as set forth in claim 2 in which the securing means for said second flexible deformable sealing element comprises a reinforcing ring welded to the outer face of said radial flange on the shield and having a series of threaded openings therein and against which said second flexible deformable sealing element bears, a pressure distributing ring bearing against the forward face of said second flexible deformable sealing element and a series of clamping bolts passing through said pressure distributing ring and said second flexible deformable sealing element and threadedly received in said openings provided in the reinforcing ring.

References Cited in the file of this patent

UNITED STATES PATENTS

| | | |
|---|---|---|
| 1,514,077 | Carlson | Nov. 4, 1924 |
| 1,841,415 | Moorhouse | Jan. 19, 1932 |
| 1,876,515 | Emmet | Sept. 6, 1932 |
| 1,898,278 | Weis | Feb. 21, 1933 |
| 1,995,691 | Stough et al. | Mar. 26, 1935 |
| 2,013,945 | Babbitt | Sept. 10, 1935 |
| 2,135,568 | Durham et al. | Nov. 8, 1938 |
| 2,197,883 | Sinclair | Apr. 23, 1940 |
| 2,251,760 | Scharntz et al. | Aug. 5, 1941 |
| 2,303,232 | Rupp | Nov. 24, 1942 |
| 2,393,944 | Walley | Jan. 29, 1946 |
| 2,415,888 | Joy | Feb. 18, 1947 |
| 2,478,067 | Vedovell | Aug. 2, 1949 |
| 2,497,479 | Vlach | Feb. 14, 1950 |
| 2,498,739 | Magnesen | Feb. 28, 1950 |
| 2,639,204 | Terry | May 19, 1950 |
| 2,653,837 | Voytech | Sept. 29, 1953 |